United States Patent
Platzer et al.

(10) Patent No.: US 10,121,620 B2
(45) Date of Patent: Nov. 6, 2018

(54) CONTROL UNIT AND ACTUATOR WITH CONTROL UNIT

(71) Applicant: AUMA Riester GmbH & Co. KG, Mullheim (DE)

(72) Inventors: Wilfried Platzer, Frieburg (DE); Benjamin Hofmann, Heitersheim (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 197 days.

(21) Appl. No.: 15/192,031

(22) Filed: Jun. 24, 2016

(65) Prior Publication Data

US 2016/0377227 A1    Dec. 29, 2016

(30) Foreign Application Priority Data

Jun. 26, 2015    (DE) .................. 10 2015 008 276

(51) Int. Cl.
  *F16P 3/20*    (2006.01)
  *H01H 36/00*    (2006.01)
  *H02H 1/00*    (2006.01)

(52) U.S. Cl.
  CPC ............. *H01H 36/00* (2013.01); *H02H 1/00* (2013.01)

(58) Field of Classification Search
  None
  See application file for complete search history.

(56) References Cited

U.S. PATENT DOCUMENTS

| 8,199,449 | B2 | 6/2012 | Kuschnarew et al. |
| 2005/0174204 | A1* | 8/2005 | Gilmore ............. H01H 36/0046 335/207 |
| 2007/0024442 | A1* | 2/2007 | Jolley ..................... E05B 17/10 340/542 |
| 2011/0037317 | A1* | 2/2011 | Kuschnarew ....... B60L 11/1887 307/9.1 |
| 2011/0291778 | A1* | 12/2011 | Rajula ................ H01H 36/0046 335/207 |
| 2012/0139671 | A1* | 6/2012 | Gilmore ............. H01H 36/0006 335/151 |

FOREIGN PATENT DOCUMENTS

DE    102008021542    11/2009

* cited by examiner

*Primary Examiner* — Jared Fureman
*Assistant Examiner* — Aqeel Bukhari
(74) *Attorney, Agent, or Firm* — Volpe and Koenig, P.C.

(57) ABSTRACT

An electronic control unit (1) or an electric actuator (2), respectively, have a switch-off device (4) which includes at least one reed switch (6, 18, 26) and at least one permanent magnet arranged outside the housing (3) and removable from the housing (3). If the permanent magnet (7) is removed from its position of usage at the housing (3), for example in order to perform maintenance of the electronic control unit (1) or of the actuator (2), respectively, the at least one reed switch (6, 18, 26) is opened, as result of which the supply link (8, 10) between the activating terminal (5) and the supply terminals (9, 11) of the control unit are interrupted in order to switch voltage-carrying functional elements of the control unit (1) and/or of the electric actuator (2) to be currentless and thus to effectively prevent an unwanted spark discharge.

18 Claims, 3 Drawing Sheets

CONTROL UNIT AND ACTUATOR WITH CONTROL UNIT

INCORPORATION BY REFERENCE

The following documents are incorporated herein by reference as if fully set forth: German Patent Application No. 102015008276.0, filed Jun. 26, 2015.

BACKGROUND

The invention relates to an electronic control unit, particularly for controlling an actuator, comprising a housing accommodating the electronic control unit, and an activating terminal.

Furthermore, the invention also relates to an electric actuator comprising an electronic control unit, and comprising a housing accommodating the electronic control unit.

Such control units and actuators with control units are known in different embodiments and have been successful. In this context, the actuator to be controlled can be connected or is connected to the activating terminal.

In the case of a maintenance or repair of such a control unit or of such an actuator or for other reasons, it may be necessary to open the housing in which the control unit is arranged. As a result, voltage-conducting parts can be exposed at which a spark discharge can possibly occur. On the one hand, this can represent a risk of injury for a person charged with the maintenance and on the other hand, such spark discharges in environments subject to explosion hazards can lead to explosions.

From DE 10 2008 021 542 A1, a contact and access protection for the high-voltage components of a hybrid vehicle is known. For this purpose, a monitoring device is provided which is fed from the low-voltage system of the vehicle. The monitoring device has electronically controllable circuit breakers which connect the electrical drive to a high-voltage battery. The high-voltage components are monitored by a low-voltage circuit loop, the circuit breakers being opened in the case of an interruption of the circuit loop and the high-voltage thus being separated. The circuit loop is separated, for example, when the engine hood is opened so that no high-voltage is present in the engine space and there is no hazard in the case of maintenance work.

In the case of this circuit, the monitoring device, however, remains permanently supplied with current so that there is still a certain hazard. It is particularly in the case of actuators which are operated in environments subject to explosion hazards that a low voltage can already be sufficient for generating an igniting spark.

SUMMARY

It is thus the object of the invention, on the one hand, to prevent a risk of injury for a person charged with maintenance or repair of the control unit or of the actuator, respectively, and, on the other hand, to avoid an explosion possibly caused by a spark discharge.

In the case of the control unit initially defined, this object is achieved by one or more features of the invention. According to the invention, it is provided particularly for achieving this object that the electronic control unit has a switch-off device, that the switch-off device comprises at least one reed switch and at least one permanent magnet arranged outside the housing and removable from the housing, the at least one reed switch being closed when the at least one permanent magnet is arranged at the housing. The at least one reed switch can be opened by removing the at least one permanent magnet from the housing. A supply link between the activating terminal and a supply terminal of the control unit is established when the reed switch is closed and is interrupted when the reed switch is opened.

The supply terminal is then used for supplying the control unit and/or consumers, appliances or devices which can be connected to it, with power.

It is thus possible that by removing the permanent magnet from the housing, voltage-conducting parts of the electronic control unit can be separated from a power supply. In this manner, a spark discharge can be effectively avoided at these voltage-conducting parts of the control unit when before or on opening the housing, that is to say when there is the risk that the voltage-conducting parts of the control unit come into contact with the environment subject to explosion, the at least one permanent magnet is removed from the housing from its position provided there.

In this arrangement, it is possible that the control unit has at least one energy store connected via a supply link, for example the supply link already mentioned before, to a supply terminal, for example the supply terminal already mentioned before. This energy store is, as a rule, a current store. Furthermore, it can be provided that a supply link, for example the supply link already mentioned before, between an energy store, especially the at least one energy store already mentioned before and a supply terminal, preferably the supply terminal already mentioned before, can be separated with the aid of the switch-off device.

The control unit preferably has at least one link capacitor as energy store. As a rule, a link capacitor is understood to be an electric capacitor in a link circuit of inverters. Its task is the coupling of the energy of a number of electrical power systems to one another on a common voltage level.

When the supply link between this energy store and a supply terminal, via which the energy store, particularly, therefore, the link capacitor, is supplied with energy or with current, respectively, can be separated with the aid of the switch-off device, the energy store or the link capacitor, respectively, can become discharged via this connected consumer as soon as the switch-off device has effected a separation of the supply link. In this manner, it can be avoided that a voltage is present at the energy store, particularly at the link capacitor, of the control unit which could lead to an unwanted spark discharge.

It may be appropriate if the switch-off device comprises at least one relay which can be operated by opening the at least one reed switch in order to effect an interruption of the supply link(s).

An accumulator and/or a battery and/or a power system terminal can be provided and/or formed on the control unit. Whereas the power system terminal of a power supply of a consumer connected to the control unit in operating position, particularly of an actuator, can be provided in normal operation, an accumulator and/or a battery can serve as emergency power supply of the consumer connected to the control unit in operating position.

It may be appropriate in this context if a supply terminal, for example the supply terminal already mentioned before, of the control unit is connected detachably or undetachably to an accumulator, for example the accumulator already mentioned before, and/or to a battery, for example the battery mentioned before, intended for the emergency power supply. Advantageously, the accumulator and/or the battery can then be arranged in the housing of the electronic control unit.

Appropriately, at least one reed switch can be allocated to an accumulator, for example the accumulator already mentioned before, and/or to a battery, particularly the battery already mentioned before, of the control unit. Alternatively or additionally, at least one reed switch can be allocated to a generator, for example the generator already mentioned before. It is of advantage in this context that the generator is reliably deactivatable. Thus, it can be avoided that an unintentional operation of the generator with the housing opened leads to an unwanted discharge at exposed contacts. Preferably, this at least one reed switch can be arranged in such a manner that the at least one reed switch, already mentioned before, of the control unit and the reed switch allocated to the accumulator and/or to the battery can be operated by a permanent magnet. In this way it is possible to ensure that, when a permanent magnet is removed from its position of usage at the housing of the control unit, not only a supply link between the activating connection and a supply terminal is interrupted but also that a supply terminal to the accumulator and/or to the battery can be interrupted. In this way, it is possible to ensure that voltage-carrying elements of the control unit and/or also of a consumer connected to the control unit in the position of usage, particularly of an actuator, are switched to be currentless and are therefore free of voltage.

In an advantageous embodiment, it may be provided that the supply link is designed to be branched with a first supply terminal and a second supply terminal. It is advantageous in this context that a number of energy sources can be provided. In particular, it can be provided in this context that in a first branch, a system connection is designed as the supply terminal and a reed switch is arranged. Thus, the invention enables a control unit to be separated reliably from the system connection when the permanent magnet is removed. In this context, the reed switch can be followed by an energy store, particularly the energy store already mentioned, for example a link capacitor. It is of advantage in this context that charging up of the energy store can be interrupted on removal of the permanent magnet. It is thus possible to achieve that the energy store discharges until the housing is opened. It is particularly advantageous here if the permanent magnet is part of a latching and/or mounting device for mounting at least one housing part on the housing. Additionally, it can be provided in this context that in a second branch, an accumulator, for example the accumulator already mentioned, and/or a battery, for example the battery already mentioned, is connected to the second supply terminal and a further reed switch is arranged. Thus, the accumulator and/or the battery can be separated from the supply terminal on removal of the permanent magnet. The switch-off device thus has two reed switches which follow the respective supply terminals in the manner described. In the second branch, it can be provided that a diode precedes the further reed switch. Thus, a current flow to the accumulator and/or to the battery can be prevented. This is particularly advantageous when the second branch is combined with the first branch behind the energy store already mentioned. Because it is in this manner that it can be prevented that the energy store discharges into the accumulator.

In an embodiment of the invention of particular significance, it may be provided that the at least one permanent magnet is part of a latching and/or mounting device for mounting at least one housing part at the housing of the control unit. In particular, it can be provided that the at least one permanent magnet is arranged in a housing lid of the housing. In this way, it can be ensured that the at least one permanent magnet is removed during an opening of the housing and during a removal of the housing part, particularly of the housing lid, and thus can no longer affect the at least one reed switch. As soon as the at least one permanent magnet is sufficiently far removed from the at least one reed switch, that is to say the effect of the at least one permanent magnet on the at least one reed switch is sufficiently low, the at least one reed switch automatically opens as a result of which the supply link(s) can be separated in the manner described before.

As a rule, a housing lid is used for closing an access opening into the interior of the housing.

Preferably, the at least one permanent magnet can then be formed and/or arranged in or on at least one mounting element, particularly a screw. With this mounting element, a housing part, preferably a housing lid which closes an access opening in the interior of the housing, can be attached to another housing part of the control unit. In this way, it can be ensured that on detaching the at least one mounting element, which may be necessary for opening the housing and for performing maintenance work, the at least one permanent magnet is necessarily removed from its position of usage at the housing and voltage-conducting parts of the control unit and/or of a consumer connected to the control unit, particularly of an actuator, are switched to be currentless, as a result of which an unwanted spark discharge can be effectively avoided.

So that the effect of the at least one permanent magnet on the at least one reed switch is not impaired when the at least one permanent magnet is arranged in its position of usage at the housing of the control unit, it may be appropriate if the housing and/or the at least one mounting element accommodating the at least one permanent magnet consists of a magnetically non-conductive material. In this way, it can be avoided that the magnetic field lines of the at least one permanent magnet extend in the material of the housing or of the mounting element accommodating the at least one permanent magnet and then do not reach the at least one reed switch. A magnetically non-conductive material can be characterized, for example, in that a presence of the material does not or at least not significantly change a course of magnetic field lines.

If the control unit has at least two reed switches connected behind one another, a redundancy of the switch-off device can be achieved. In this way, it can be ensured that the switch-off device functions even if one of the two reed switches should be defective. This is because, in the case of this circuit it is possible that in any event, at least one of the reed switches opens when the permanent magnet is removed from its position of usage at the housing.

Alternatively or additionally, it can also be provided that the control unit has at least two reed switches connected in parallel with one another. In this way, it is possible to achieve that at least one reed switch closes and thus reverses an interruption of the supply link when a permanent magnet is brought into its intended position of usage at the housing of the control unit. An additional improvement of the switch-on or switch-off reliability can be achieved if the control unit has a series circuit of reed switches connected in parallel with one another and/or a parallel circuit of reed switches connected in series.

In order to additionally increase the safety for an operator in the maintenance of the control unit it can be provided that the control unit is configured to detect a switch position of the at least one reed switch of the control unit and/or switch a motor of a drive connectable and/or connected with the control unit, particularly an actuator, to be currentless.

Additionally or as an alternative, the control unit can also be configured for discharging an energy store, for example the energy store already mentioned before. In dependence on a detected switch position of the at least one reed switch, the control unit can deactivate the motor in this way by using corresponding circuits and also actively discharge the energy store designed in particular as link capacitor in order to prevent an unwanted spark discharge and/or an operation of the motor to be avoided during a repair or maintenance.

In the case of the electric actuator defined initially, an electric actuator having the features of the independent patent claim directed towards an actuator is proposed for achieving the said object. In particular, the object mentioned initially is achieved with such an electric actuator by the fact that the electronic control unit is a control unit according to the invention, particularly as described before and/or in accordance with one of the claims directed to a control unit. In this way, both an unwanted spark discharge and a possibly hazardous operation of the motor during a maintenance of the electric actuator or of the electronic control unit of this electric actuator can be avoided. Such an electric actuator is thus suitable to a particular degree also for use in environmental conditions subject to explosion hazards.

Suitably, a motor of the actuator can be switchable to be currentless by removing the at least one permanent magnet, especially due to the fact that a discharging of a or the link capacitor of the control unit can be triggered by removing the at least one permanent magnet.

When using at least two reed switches, it can be provided that the reed switch by means of which discharging of an energy store can be triggered passes out of an effective range of the permanent magnet first during the removal. This can be achieved by a corresponding spatial arrangement. It is of advantage in this context that sufficient time remains for discharging until the complete removal of the permanent magnet.

In this context, the actuator and the control unit can preferably be arranged in a common housing. In this way, it is possible to ensure that in the case of an opening of the housing, the at least one reed switch of the control unit is opened by removal of the at least one permanent magnet from its position of use at the housing as a result of which a supply link in the interior of the housing can be interrupted for switching the voltage-carrying elements of the actuator or of the control unit, respectively, to be currentless.

It can also be particularly advantageous if a removable permanent magnet and an associated reed switch of the switch-off device are provided at a, preferably at each maintenance opening in the housing of the actuator. In this manner, it is possible that each maintenance opening of the actuator is protected with the switch-off device according to the invention so that switching of the voltage-carrying parts of the control unit and/or of the actuator to be currentless is possible independently of which of the possibly several maintenance openings of the housing is utilized.

It should be pointed out that the control unit and/or the actuator and/or a housing of the control unit and/or of the actuator can be designed to be protected against explosions if this is required by the environmental conditions in which the control unit or the electric actuator, respectively, are to be used.

BRIEF DESCRIPTION OF THE DRAWINGS

In the text which follows, exemplary embodiments of the invention are described in greater detail by means of the figures, in which, in partially greatly diagrammatic representation.

DETAILED DESCRIPTION OF THE PREFERRED EMBODIMENTS

Figure 1:
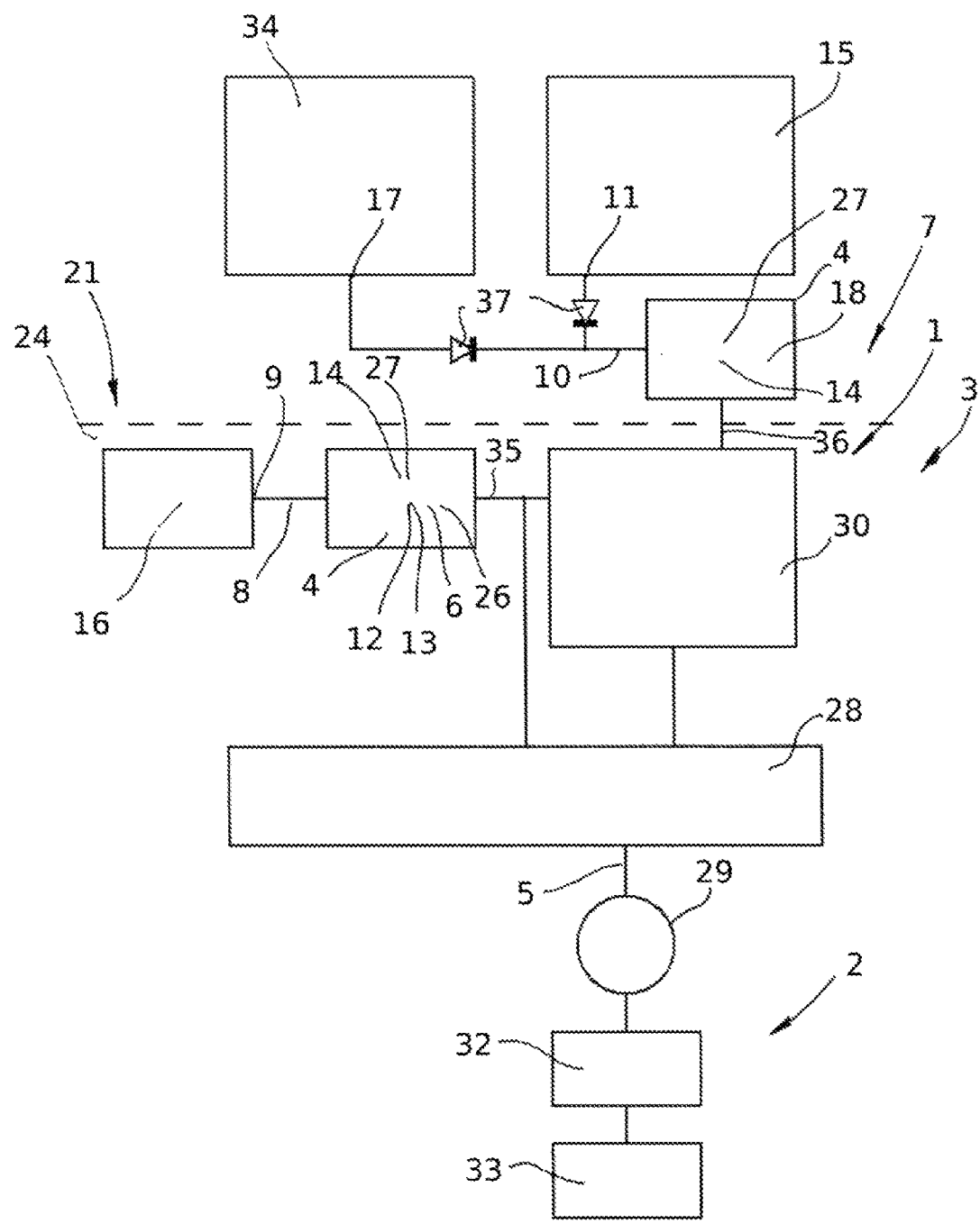
FIG. 1 shows a diagrammatic overview of a control unit according to the invention and of an actuator according to the invention, connected to the control unit, wherein the switch-off device engaging two different supply links can be recognized.
Figure 4:
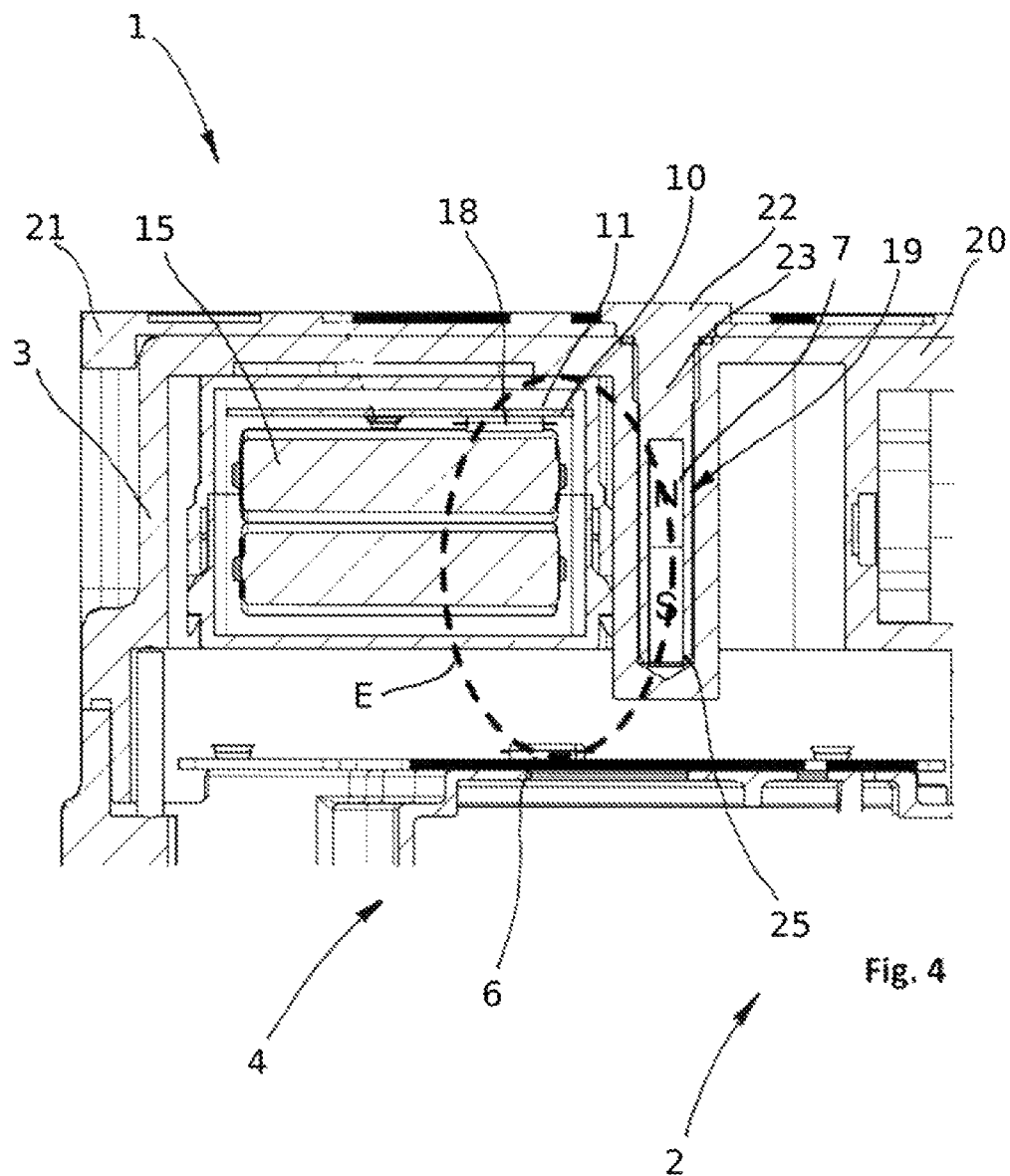
FIG. 4 shows a broken-out sectional view of a housing of a control unit according to the invention, wherein a permanent magnet arranged in a mounting element, designed as screw, of the housing, two reed switches arranged in a magnetic field, illustrated by an ellipse shown dashed, of the permanent magnet, of the switch-off device can be recognized, wherein one of the two reed switches is allocated to an accumulator used for an emergency power supply.

FIGS. 1 and 4 show an electronic control unit, designated by 1 overall, which is connected to the actuator 2 for controlling an actuator 2. The electronic control unit 1 is arranged in a housing 3 which is shown in section in FIG. 4.

The electronic control unit 1 has a switch-off device 4 for an activating terminal 5 of the control unit 1. The switch-off device 4 comprises at least one reed switch 6 and at least one permanent magnet 7 arranged outside the housing 3 and removable from the housing 3.

The at least one reed switch 6 is closed when the one permanent magnet 7 is arranged at the housing 3 (compare FIG. 4). The reed switch 6 can be opened by removing the permanent magnet 7 from its position of usage at the housing. This is carried out in that the magnetic field illustrated by the ellipse E shown in dashed line in FIG. 4 is removed by removing the permanent magnet 7 from the reed switch 6 so that no sufficiently large magnetic effect can be induced in the latter any longer in order to keep the reed switch 6 closed.

A supply link 8 between the activating terminal 5 and a supply terminal 9 of the control unit 1 which is used for the main supply of the actuator 2 is established or activated with the reed switch 6 closed. This supply link 8 can be interrupted by an opening of the reed switch 6. Thus, the voltage-carrying functional elements arranged in the control unit 1 can be switched to be currentless by removing the permanent magnet 7 in order to avoid a spark discharge which must be absolutely avoided when opening the housing 3 in an environment subject to explosion hazards.

The control unit 1 also has an energy store 12, connected to the supply terminal 9 via the supply links 8, which is designed as current store. As described, the supply links 8 between energy store 12 and the supply terminal 9 can be separated with the aid of the switch-off device 4.

The energy store 12 shown greatly diagrammatically in FIG. 1 is designed as link capacitor 13.

Figure 2:
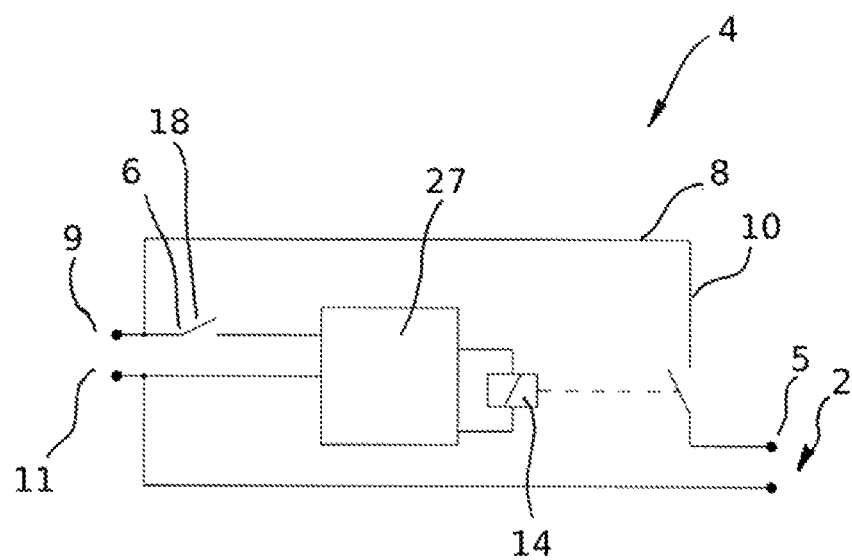
FIG. 2 shows a simplified circuit diagram of a first switch-off device according to the invention comprising a reed switch which is connected to a relay driver of a relay, which relay is configured to interrupt a supply link of the control unit or of the actuator, respectively.
Figure 3:
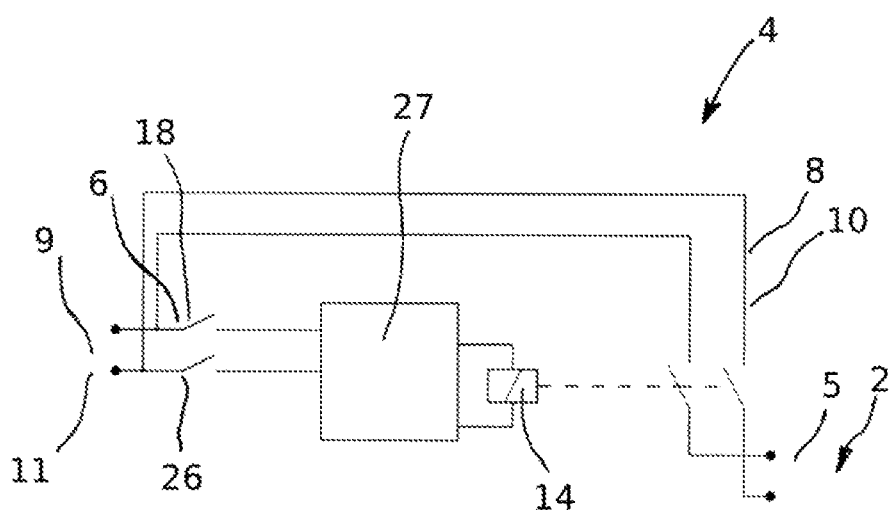
FIG. 3 shows a simplified circuit diagram of a switch-off device according to the invention comprising two series-connected reed switches, both of which are connected to a relay driver of a relay which is configured for interrupting a supply link of the control unit or of the electric actuator.

As shown in FIGS. 2 and 3, the switch-off device 4 comprises a relay 14 which can be operated by opening the reed switch 6 in order to effect an interruption of the supply links 8, 10 also shown only highly diagrammatically in FIGS. 2 and 3. The reed switch 6 is connected to a relay driver 27 which processes the setting signal of the reed switch 6 and forwards it to the relay 14.

According to FIGS. 1 and 4, an accumulator 15 or a battery 15, respectively, and a line terminal 16 is provided or formed at the control unit 1. Via the line terminal 16, the supply terminal 9 of the control unit 1 can be supplied with current which is necessary for operating the actuator 2.

A second supply terminal 11 of the control unit is connected to the accumulator 15. Depending on the exemplary embodiment of the control unit 1, this link between the supply terminal 11 and the accumulator or the battery, respectively, 15 can be designed to be detachable or also undetachable.

Also for an emergency power supply, a, particularly hand-operated, generator 34 is provided which is also connected to the supply link 10 via a supply terminal 17 of the control unit 1 and can thus deliver current to the activating terminal 5 when required.

Overall, the supply link 8, 10 is thus designed to be branched with a first branch 35 and a second branch 36 which are brought together in a Y shape at the supply terminal 5.

In the first branch 35, the line terminal 16 is formed at the supply terminal 9, via which the control unit 1 can be connected or is connected to a supply system. The first supply terminal 9 is followed by the aforementioned reed switch 6 which is followed by an energy store 12.

In the second branch 36 which, in turn, is designed itself to be branched with second supply terminals 11, 17, diodes 37 in each case follow the second supply terminals 11, 17. These diodes 37 are followed by the further reed switch 18 by means of which the generator 34 and the accumulator 15 (or a battery) can be separated from the supply link 8, 10.

FIGS. 1 and 4 also show that a reed switch 18 is also allocated to the accumulator 15 of the control unit 1.

This reed switch 18 allocated to the accumulator 15 is arranged in such a manner that the reed switch 6 of the control unit 1 and the reed switch 18 allocated to the accumulator 15 or the battery 15, respectively, can be operated by one and the same permanent magnets 7.

This becomes particularly clear by the representation according to FIG. 4 in which the magnetic field emanating from the permanent magnet 7 is illustrated by means of the ellipse E shown dashed. On consideration of FIG. 4 it can be seen that both reed switches 6 and 18, with the permanent magnet 7 arranged in the position of usage, are located at least partially within the ellipse E and thus within the effective range of the permanent magnet 7.

If then the permanent magnet 7 is removed from its position of usage at the housing 3, first the reed switch 6 of the control unit 1 and then the reed switch 18 allocated to the accumulator 15 or the battery 15 pass out of the effective range of the permanent magnet 7, as a result of which first the reed switch 6 and then the reed switch 18 are opened in order to interrupt the respective supply links 8 and 10, respectively, and in this way to separate the voltage-carrying functional elements of the control unit 1 and of an actuator 2 connected to the control unit 1 from the power supply. Since the reed switch 6 triggers a discharge of the link capacitor 13, sufficient time remains for discharging due to the spatial arrangement of the reed switch 6 with respect to the magnet 7 until the mounting element 22 described below can be removed. In general, an order of the actuation on removal of the magnet 7 can thus be defined by the spatial arrangement of reed switches 6, 18, 26. Thus, especially sensitive operating areas can easily be switched off first and less sensitive operating areas thereafter.

It should be pointed out here that in the exemplary embodiment shown in the figures, the generator 34 which is connected to the supply link 10 via the supply terminal 17 can also be decoupled from the control unit 1 with the aid of the reed switch 18.

In another exemplary embodiment of the invention, a further one or several reed switches can also be provided which are allocated exclusively to the generator 34 and/or a supply link of the generator 34 and with a removal of one or the permanent magnet 7 provide for an interruption of the supply link(s) to the generator 34.

FIG. 4 also shows that the permanent magnet 7 is a part of a latching and/or mounting device 19 for mounting at least one housing part 20 at the housing 3. The permanent magnet 7 is arranged in a housing lid 21 of the housing 3 in its position of usage.

The permanent magnet 7 is positioned in a mounting element 22 which, in the present case, is designed as screw 23. By this mounting element 22, the housing part 20, that is to say the housing lid 21 in the present case, is attached to the other housing part, namely a basic body 24 of the housing 3.

In this arrangement, the permanent magnet 7 is arranged in a blind hole 25 provided in the screw 23 and can there be bonded or crimped with the screw 23, for example, in order to prevent the permanent magnet 7 from falling out of the blind hole 25.

So that the two reed switches 6 and 18 are not shielded from the magnetic field of the permanent magnet 7, the housing 3 and the mounting element 22 accommodating the permanent magnet 7 consist of a magnetically non-conductive material.

According to the exemplary embodiment of the control unit 1, shown in FIG. 3, the former has two series-connected reed switches 6 and 26. Both reed switches 6 and 26 are connected to a relay driver 27 which effects switching of the relay 14 in dependence on the switch position of the two reed switches 6 and 26. If one of the two reed switches 6 and 26 is open, the relay 14 is also moved into an open position with the aid of the relay driver 27 and the supply link 8 and 10, respectively, are interrupted.

In the case of other exemplary embodiments, not shown in the figures, however, it can also be provided that the control unit 1 has at least two reed switches connected in parallel with one another. Furthermore, it is possible that at the control unit 1, a series circuit of reed switches connected in parallel with one another and/or a parallel circuit of series-connected reed switches is exhibited.

The control unit 1 is configured to detect a switch position of the reed switches 6, 18 and 26 of the control unit 1. Depending on the switch position of the reed switches 6, 18, 26, the control unit 1 can switch, by a circuit provided on a processor board 28, a motor 29 of the actuator 2 connected to the control unit 1 in its position of usage, to be currentless and/or brake it and stop it.

Furthermore, it is possible to discharge the energy store 12, designed as link capacitor 13, selectively by the circuit present on the processor board 28 in dependence on the detected switch position of the reed switches 6, 18, 26.

The processor board 28 and other electronic elements of the control unit 1 can be supplied with current via the system part 30.

In principle, it is conceivable also to switch the system part 30 to be currentless with the aid of the switch-off device 4, preferably with a time delay.

The electric actuator 2 and the control unit 1 are arranged in the same housing 3. The actuator 2 is here connected to the activating terminal 5 of the electronic control unit 1.

As already stated before, the motor 29 of the actuator 2 can be switched to be currentless by removing the permanent magnet 1. This can be achieved, for example, in that the link capacitor 13 already mentioned before, of the control unit 1 can be discharged by removing the permanent magnet 7.

Following the motor 29, a power transmission 32 and a power take-off 33 are provided, for example.

It should be pointed out that in a preferred exemplary embodiment of the electric actuator 2, at least one removable permanent magnet 7 and a reed switch allocated to it, of the switch-off device 4 are provided at each maintenance opening of the housing 3 of the actuator 2 in order to ensure that in the case of an opening of the maintenance openings, the functional elements of the control unit 1 or of the actuator 2, respectively, are switched to be currentless.

The permanent magnet 7 shown in FIG. 4 is designed as rod magnet, the north pole of which is identified by the letter N and the south pole of which is identified by the letter S.

The electronic control unit 1 and the electric actuator 2, respectively, have the switch-off device 4 which comprises at least one reed switch 6, 18, 26 and at least one permanent magnet arranged outside the housing 3 and removable from the housing 3. If the permanent magnet 7 is removed from its position of usage at the housing 3, for example in order to perform maintenance of the electronic control unit 1 or of the actuator 2, respectively, the at least one reed switch 6, 18, 26 is opened, as a result of which the supply link 8, 10 between the activating terminal 5 and the supply terminals 9, 11, 17 of the control unit are interrupted in order to switch voltage-carrying functional elements of the control unit 1 and/or of the electric actuator 2 to be currentless and thus to effectively prevent an unwanted spark discharge.

The invention claimed is:

1. An electronic control unit (1), comprising
a housing (3) including first and second housing parts (20, 24),
an activating terminal (5),
a switch-off device (4), the switch-off device (4) comprises at least one reed switch (6, 18, 26) and at least one permanent magnet (7) arranged outside the housing (3) and removable from the housing (3), the at least one reed switch (6, 18, 26) is closed when the at least one permanent magnet (7) is arranged at the housing (3), and the at least one reed switch (6, 18, 26) is opened by removing the at least one permanent magnet (7) from the housing (3),
wherein a supply link (8, 10) between the activating terminal (5) and at least one supply terminal (9, 11, 17) is established when the reed switch (6, 18, 26) is closed and is interrupted when the reed switch (6, 18, 26) is opened, so that voltage-carrying functional elements arranged in the control unit (1) are switched to be currentless by the removing of the at least one permanent magnet (7), and
the at least one permanent magnet (7) is at least one of formed or arranged in or on a mounting element (22), and said mounting element (22) attaches the first housing part (20) to the second housing part (24).

2. The control unit (1) as claimed in claim 1, further comprising at least one energy store (12) connected to the at least one supply terminal (9, 11, 17) via the supply link (8, 10).

3. The control unit (1) as claimed in claim 2, wherein the at least one energy store is a at least one current store, and the supply link (8, 10) between the at least one energy store (12) and the at least one supply terminal (9, 11, 17) is separated by the switch-off device (4).

4. The control unit (1) as claimed in claim 2, wherein the energy store (12) comprises at least one link capacitor (13).

5. The control unit (1) as claimed in claim 1, wherein the switch-off device (4) comprises at least one relay (14) which is operable by opening the at least one reed switch (6, 18, 26) in order to effect an interruption of the supply link (8, 10).

6. The control unit (1) as claimed in claim 1, further comprising at least one of an accumulator (15), a battery, or a power system terminal (16) provided or formed on the control unit (1).

7. The control unit (1) as claimed in claim 6, wherein the at least one supply terminal (9, 11, 17) is connected detachably or undetachably to the at least one of the accumulator (15), the battery, or the power system terminal (16).

8. The control unit (1) as claimed in claim 1, where further comprising at least one of an accumulator (15) or a battery, and at least one further reed switch (6, 18, 26) allocated to the at least one of the accumulator (15) or the battery, said at least one further reed switch (6, 18, 26) being arranged such that the reed switch (6, 18, 26) and the at least one further reed switch (6, 18, 26) allocated to the at least one of the accumulator (15) or the battery is operable by the at least one permanent magnet or a further permanent magnet (7).

9. The control unit as claimed in claim 1, wherein the supply link (8, 10) is designed to be branched with a first supply terminal (9) and a second supply terminal (11, 17), in a first branch (35), a power system terminal (16) is designed as the first supply terminal (9) and the reed switch (6) is arranged with energy store (12) following said reed switch (6) and, in a second branch (36), at least one of an accumulator (15), a battery, or a generator (34) is connected to the second supply terminal (11, 17) and a further one of the reed switches (6) is arranged with a diode (37) preceding said further one of the reed switches (6).

10. The control unit (1) as claimed in claim 1, wherein or the at least one mounting element (22) accommodating the at least one permanent magnet (7) is formed of a magnetically non-conductive material.

11. The control unit (1) as claimed in claim 1, wherein the control unit (1) has at least one of the following: at least two of the reed switches (6, 18, 26) connected in series behind one another; at least of the two reed switches (16, 18, 26) connected in parallel with one another; a series circuit of the reed switches (6, 18, 26) connected in parallel with one another; or a parallel circuit of series-connected ones of the reed switches (6, 18, 26).

12. The control unit (1) as claimed in claim 1, wherein the control unit (1) is configured for at least one of detecting a switch position of the at least one reed switch (6, 18, 26), switching a motor (29) of a drive that is connectable to the control unit (1) to be currentless, or discharging an energy store (12).

13. An electric actuator (2) comprising an electronic control unit (1) as claimed in claim 1.

14. The electric actuator (2) as claimed in claim 13, further comprising a motor (29) that is switched to be currentless by removing the at least one permanent magnet (7) to a discharge a link capacitor (13) of the control unit (1) triggered by removing the at least one permanent magnet (7).

15. The electric actuator (2) as claimed in claim 13, wherein the housing for the control unit (1) is a common housing (3) for the actuator (2) and the control unit (1).

16. The electric actuator (2) as claimed in claim 15, wherein at least one of the removable permanent magnets (7) and at least one of the reed switches (6, 18, 26) are provided at a maintenance opening of the housing (3) of the actuator (2).

17. The control unit (1) as claimed in claim 1, wherein the first housing part is a lid, and the second housing part is a basic housing body.

18. The control unit (1) as claimed in claim 1, wherein the mounting element is removable from the basic housing body and the lid prior to removal of the lid from the basic housing body.

* * * * *